(12) United States Patent
Fujihara

(10) Patent No.: US 11,491,931 B2
(45) Date of Patent: Nov. 8, 2022

(54) VEHICLE OPERATION SYSTEM AND VEHICLE OPERATION METHOD

(71) Applicant: HONDA MOTOR CO., LTD., Tokyo (JP)

(72) Inventor: Naoki Fujihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 712 days.

(21) Appl. No.: 16/412,486

(22) Filed: May 15, 2019

(65) Prior Publication Data

US 2019/0381958 A1 Dec. 19, 2019

(30) Foreign Application Priority Data

Jun. 14, 2018 (JP) .............................. JP2018-113778

(51) Int. Cl.
| | | |
|---|---|---|
| *B60R 16/023* | (2006.01) | |
| *B60R 16/037* | (2006.01) | |
| *G06F 3/04883* | (2022.01) | |
| *G10L 15/22* | (2006.01) | |

(52) U.S. Cl.
CPC ...... *B60R 16/0231* (2013.01); *B60R 16/0373* (2013.01); *G06F 3/04883* (2013.01); *G10L 15/22* (2013.01); *G10L 2015/223* (2013.01)

(58) Field of Classification Search
CPC . B60R 16/0231; B60R 16/0373; B60R 16/02; G06F 3/04883; G10L 15/22; G10L 2015/223; B60K 2370/122; B60K 2370/1438; B60K 2370/145; B60K 2370/1468; B60K 2370/1537; B60K 37/06; B60K 20/02
See application file for complete search history.

(56) References Cited

U.S. PATENT DOCUMENTS

| | | | |
|---|---|---|---|
| 9,103,691 B2* | 8/2015 | Waller | G06F 3/0447 |
| 9,248,839 B1* | 2/2016 | Tan | B60K 37/06 |
| 10,110,272 B2* | 10/2018 | Barnett, Jr. | H04M 1/72412 |
| 10,124,648 B2* | 11/2018 | Hsiao | B32B 3/266 |
| 10,513,184 B2* | 12/2019 | Lee | G06V 20/597 |

(Continued)

FOREIGN PATENT DOCUMENTS

| | | |
|---|---|---|
| CN | 108073169 | 5/2018 |
| JP | 2002-189560 | 7/2002 |
| JP | 2004-071416 | 3/2004 |

OTHER PUBLICATIONS

Chinese Office Action for Chinese Application No. 201910409205.8 dated Jul. 27, 2022.

*Primary Examiner* — Frederick M Brushaber

(74) *Attorney, Agent, or Firm* — Amin, Turocy & Watson, LLP

(57) ABSTRACT

A vehicle operation system includes an operation unit disposed within a vehicle and including an operating element configured to receive an operation of an occupant of the vehicle, a determiner configured to determine a target-specific device serving as an operation target from among a plurality of specific devices on the basis of an operation different from a mechanical operation performed on the operating element by the occupant of the vehicle, and a device controller configured to control the target-specific device on the basis of the mechanical operation performed on the operating element by the occupant of the vehicle.

14 Claims, 18 Drawing Sheets

(56) References Cited

U.S. PATENT DOCUMENTS

| | | |
|---|---|---|
| 2004/0189093 A1 | 9/2004 | Belmaond |
| 2017/0235371 A1 | 8/2017 | Hsiao et al. |
| 2018/0062691 A1 | 3/2018 | Barnett, Jr. |

* cited by examiner

| GESTURE | SPECIFIED DEVICE | CONTROL MODE |
|---|---|---|
| A | DIRECTION INDICATOR/DRIVER | 01 |
| B | WIPER | 02 |
| C | LIGHT | 03 |
| C | WINDOW | 04 |
| D | AIR CONDITIONER | 05 |
| E | AUDIO | 06 |
| F | SEAT | 07 |
| ... | ... | ... |

| SPEECH | SPECIFIED DEVICE | CONTROL MODE |
|---|---|---|
| A | DIRECTION INDICATOR/DRIVER | 01 |
| B | WIPER | 02 |
| C | LIGHT | 03 |
| C | WINDOW | 04 |
| D | AIR CONDITIONER | 05 |
| E | AUDIO | 06 |
| F | SEAT | 07 |
| ... | ... | ... |

| CONTACT OPERATION | SPECIFIED DEVICE | CONTROL MODE |
|---|---|---|
| A | DIRECTION INDICATOR/DRIVER | 01 |
| B | WIPER | 02 |
| C | LIGHT | 03 |
| C | WINDOW | 04 |
| D | AIR CONDITIONER | 05 |
| E | AUDIO | 06 |
| F | SEAT | 07 |
| ... | ... | ... |

| CONTROL MODE | PUSH AT REFERENCE POSITION | SLIDE FROM REFERENCE POSITION IN X DIRECTION | ... | SLIDE IN RIGHT DIRECTION SLIDE IN X DIRECTION | ... |
|---|---|---|---|---|---|
| 01 | MANUAL MODE OFF OF DIRECTION INDICATOR | D RANGE | ... | RIGHT DIRECTION INDICATOR FLASHING FOR 3 Sec | ... |
| 02 | ALL OFF | FR | ... | – | ... |
| 03 | – | AUTO HIGH | ... | – | ... |
| 04 | STOP | – | ... | R FORWARD DESIGNATION | ... |
| 05 | OFF | HEATING | ... | SELECTION OF AIR BLAST TO FACE | ... |
| 06 | OFF | CHANNEL SELECTION | ... | SELECTION OF AM | ... |
| 07 | SLIDE MODE | – | ... | FORWARD INCLINATION/ FORWARD SLIDE | ... |
| ... | ... | ... | | ... | ... |

VEHICLE OPERATION SYSTEM AND VEHICLE OPERATION METHOD

CROSS-REFERENCE TO RELATED APPLICATION

Priority is claimed on Japanese Patent Application No. 2018-113778, filed Jun. 14, 2018, the content of which is incorporated herein by reference.

BACKGROUND

Field of the Invention

The present invention relates to a vehicle operation system and a vehicle operation method.

Description of Related Art

A configuration for collectively performing a selection operation of selecting an in-vehicle device (hereinafter referred to as a target device) serving as an operation target from among a plurality of in-vehicle devices and a setting operation of setting operation forms (for example, function setting and adjustment and the like) of the selected in-vehicle device is known for a vehicle operation device.

For example, a device having a joystick-type knob and a rotary knob disposed on an instrument panel and selection switches arrayed in an arc around the joystick-type knob and the rotary knob has been disclosed (for example, Japanese Unexamined Patent Application, First Publication No. 2002-189560). The selection switches are individually provided in correspondence with the in-vehicle devices.

This device performs the setting operation on the target device using the joystick type knob and the rotary knob after performing the selection operation on the target device using the selection switch, thereby causing the in-vehicle device to be operated in a desired operation form.

However, the conventional technology described above is configured to perform both the selection operation and the setting operation through a mechanical operation on a switch or a knob. Thus, in order to cause the target device to accurately execute the desired function, it is necessary to execute the desired function while performing checking by hand. As a result, the eye movements of an occupant are increased and there is still room for improvement in terms of improving operability.

SUMMARY

An objective of the present invention is to provide a vehicle operation system capable of improving operability.

A vehicle operation system and a vehicle operation method according to the present invention adopt the following configurations.

(1): According to an aspect of the present invention, a vehicle operation system includes an operation unit disposed within a vehicle and including an operating element configured to receive an operation of an occupant of the vehicle; a determiner configured to determine a target-specific device serving as an operation target from among a plurality of specific devices on the basis of an operation different from a mechanical operation performed on the operating element by the occupant of the vehicle; and a device controller configured to control the target-specific device on the basis of the mechanical operation performed on the operating element by the occupant of the vehicle.

(2): In the above-described aspect (1), the vehicle operation system further includes a mode setter configured to set a control mode for controlling the target-specific device determined by the determiner, wherein the device controller controls the target-specific device on the basis of the control mode set by the mode setter and the mechanical operation performed on the operating element by the occupant of the vehicle.

(3): In the above-described aspect (1), the different operation is a gesture or speech of the occupant of the vehicle or a contact operation on a touch panel provided in the operating element.

(4): In the above-described aspect (3), the mechanical operation is at least any one of a swing operation, a pushing operation, and a rotating operation.

(5): In the above-described aspect (4), the device controller controls the target-specific device on the basis of an input operation on the touch panel provided in the operating element.

(6): In the above-described aspect (5), the device controller sets a target-specific device serving as a control target from among a plurality of homogeneous target-specific devices determined by the determiner on the basis of a first operation that is mechanical and controls an amount of control of the set target-specific device on the basis of a second operation that is mechanically performed after the first operation.

(7): In the above-described aspect (6), the second operation is an operation that is performed in a state in which the first operation has been performed.

(8): In the above-described aspect (7), the vehicle includes a plurality of homogeneous target-specific devices and the operating element includes a first display for causing information for guiding any one target-specific device to be selected among the plurality of homogeneous target-specific devices determined by the determiner to be displayed.

(9): In the above-described aspect (8), the first display is provided in the operating element.

(10): In the above-described aspect (3), the determiner is able to perform switching between a determination mode for determining the target-specific device on the basis of the gesture and a determination mode for determining the target-specific device on the basis of the speech.

(11): In the above-described aspect (10), the vehicle operation system includes a replier configured to reply to the occupant of the vehicle with a determination result of the determiner.

(12): According to an aspect of the present invention, a vehicle operation system includes an operation unit disposed within a vehicle and including an operating element configured to receive an operation of an occupant of the vehicle; a determiner configured to determine a target-specific device serving as an operation target from among a plurality of specific devices on the basis of a first specific operation that is one operation of a mechanical-specific operation performed on the operating element by the occupant of the vehicle and a non-mechanical-specific operation different from the specific operation; and a device controller configured to control the target-specific device on the basis of a second specific operation different from the first specific operation between the mechanical-specific operation performed on the operating element by the occupant of the vehicle and the non-mechanical-specific operation different from the specific operation.

(13): According to an aspect of the present invention, a vehicle operation method includes determining, by a computer, a target-specific device serving as an operation target from among a plurality of specific devices on the basis of an operation different from a mechanical operation performed on an operating element of an operation unit by an occupant of a vehicle, wherein the operation unit is disposed within the vehicle and includes the operating element configured to receive an operation of the occupant of the vehicle; and controlling, by the computer, the target-specific device on the basis of the mechanical operation performed on the operating element by the occupant of the vehicle.

According to the above-described aspects (1) to (3), (5), (12) and (13), it is possible to improve operability. Specifically, the occupant of the vehicle can operate the device without moving his/her line of sight.

According to the above-described aspects (4), (6), and (7), it is possible to perform an operation in which context imagined by an operator matches a hand motion.

According to the above-described aspects (8) and (9), the occupant of the vehicle can easily check control details and an operation form when he/she desires to check them.

According to the above-described aspect (10), it is possible to set a method of specifying a specific device according to the needs of the vehicle occupant.

According to the above-described aspect (11), because a notification of information of a control target is provided by speech or screen display, it is possible to easily recognize whether the control target is an intended control target. As a result, control of an unintended control form can be inhibited.

BRIEF DESCRIPTION OF THE DRAWINGS

FIG. 4 is a diagram showing an example of details of action information.

FIG. 5 shows mode information that is information in which a control mode, operation details with respect to an operation unit, and control details of a target-specific device are associated with each other.

DETAILED DESCRIPTION OF THE INVENTION

Hereinafter, embodiments of the present invention will be described on the basis of the drawings. The following description will be given using XYZ coordinates as necessary. For example, an X direction is a central axis direction of a vehicle M, a Y direction is a width direction of the vehicle M, and a Z direction is an upward/downward direction of the vehicle M (a direction orthogonal to the XY direction). In the plan view, a +X direction may be referred to as a forward direction, a −X direction may be referred to as a backward direction, a +Y direction may be referred to as a right direction, a −Y direction may be referred to as a left direction, and a −Z direction may be referred to as a depth direction.

Figure 1:
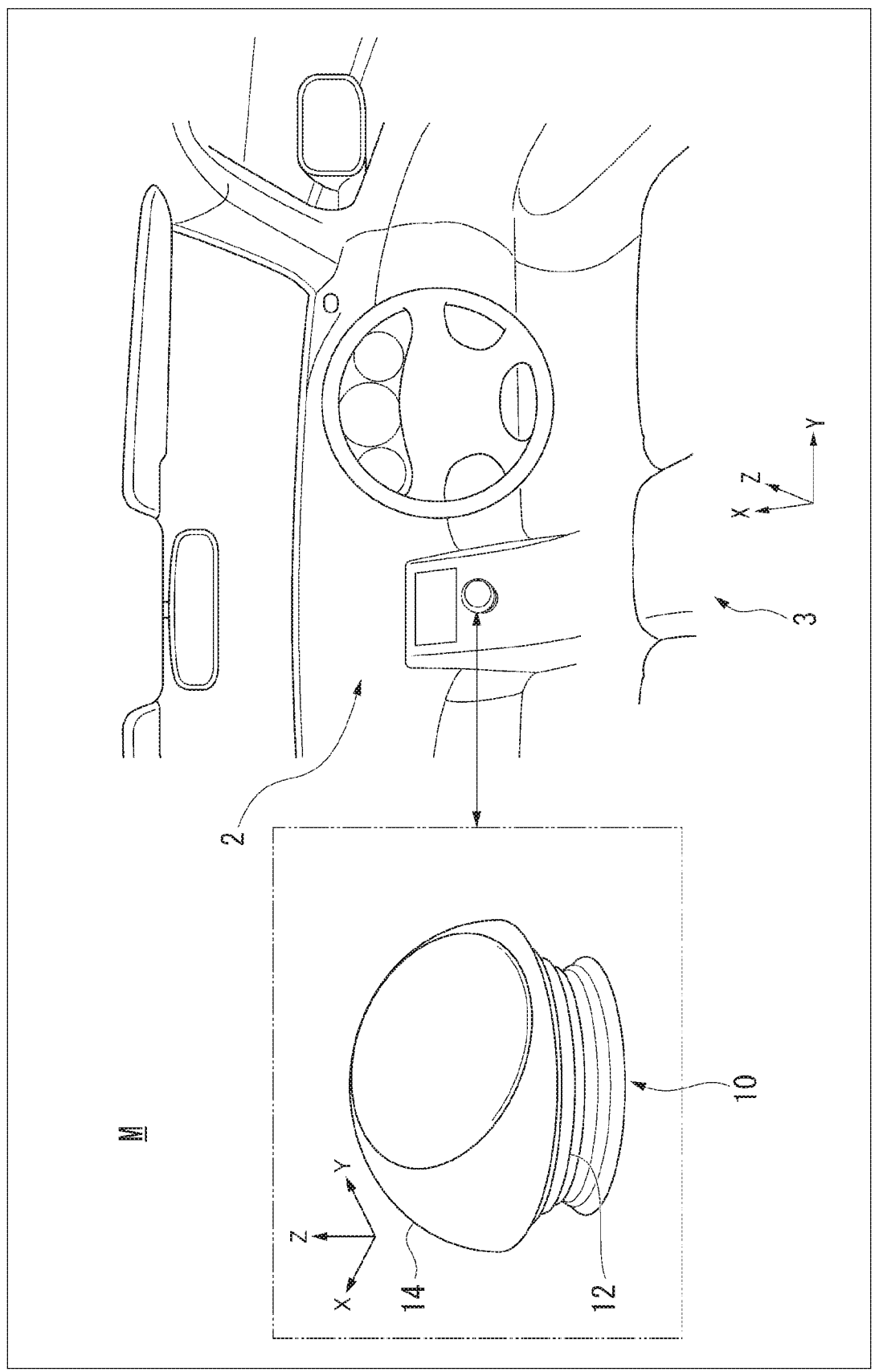
FIG. 1 is a diagram showing an example of a state of a vehicle interior provided with an operation unit included in a control system and a perspective view of the operation unit.

FIG. 1 is a diagram showing an example of a state of a vehicle interior provided with an operation unit 10 included in a control system and a perspective view of the operation unit 10. The operation unit 10 is disposed at a position (for example, an instrument panel 2) which an operator's hand can easily reach in the vehicle M. The operation unit 10 may be disposed, for example, on a center console 3 or the like.

The operation unit 10 is supported by, for example, a base provided inside the instrument panel 2. The operation unit 10 has an operation shaft 12 standing upright from a base portion, and an operating element 14 attached to a tip of the operation shaft. The operating element 14 is formed, for example, in a dome shape (a hemisphere shape). However, a shape of the operating element 14 can be appropriately changed as long as the operator can hold the operating element 14.

The operator can mechanically operate the operation unit 10 via the operating element 14. In the present embodiment, for example, a tilting mechanism, a pushing mechanism, and a rotating mechanism (all not shown) are mounted on the operation unit 10. The tilting mechanism includes, for example, a spherical bearing provided on the base. The tilting mechanism supports the operation shaft 12 of the operation unit 10 so that the operation shaft 12 can be tilted in forward-backward and left-right directions. In the present embodiment, the operation unit 10 can be tilted from a reference position to a plurality of forward, backward, left, and right positions.

Specifically, the operation unit 10 can be tilted to a position at which the operation unit 10 has been tilted in the upward/downward direction with respect to the reference position or a position at which the operation unit 10 has been tilted in the left-right direction from the position at which the operation unit 10 has been tilted in the upward/downward direction, a position at which the operation unit 10 has been tilted forward or backward in a state in which the operation unit 10 has been tilted from the reference position to a left side, a position at which the operation unit 10 has been tilted forward or backward in a state in which the operation unit 10 has been tilted from the reference position to a right side, and the like.

The pushing mechanism includes a biasing member that biases the operating element 14 upwardly with respect to the support shaft. The pushing mechanism causes the operating element 14 to be operated in the +/−Z direction with respect to the operation shaft 12 according to a pushing operation on the operating element 14. The rotating mechanism supports the operating element 14 so that the operating element 14 is rotatable about the axis of the support shaft with respect to the support shaft. It is preferable that the operation unit 10 be held at the reference position by a biasing force of a biasing member (not shown) or the like in a state in which at least an operating force during the swing operation or the pushing operation is not applied (a so-called momentary type).

As described above, in the operation unit 10 of the present embodiment, a swing (tilting) operation, a pushing operation, a rotating operation, and the like are possible. However, the tilting mechanism, the pushing mechanism, and the rotating mechanism are not limited to the configurations described above and various configurations can be adopted. The operation form of the operation unit 10 may be at least any one of the above-described operations, and is able to be an operation other than the above-described operations.

Figure 2:
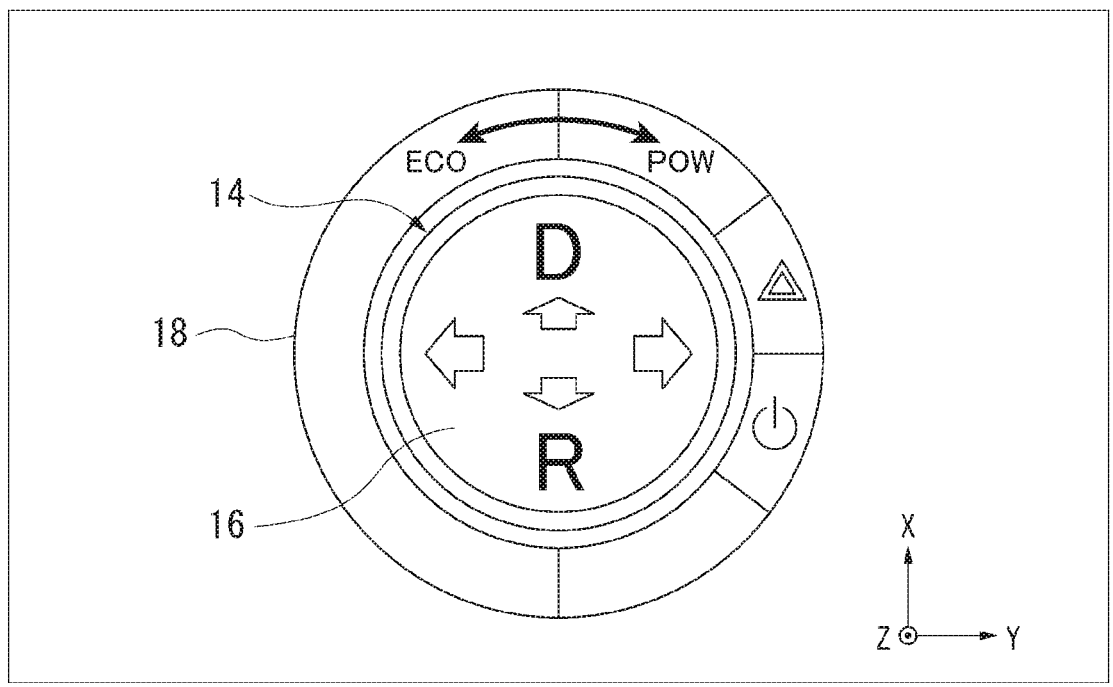
FIG. 2 is a plan view of an operating element and a second display.

FIG. 2 is a plan view of the operating element 14 and the second display 18. As shown in FIG. 2, the operation unit 10 has a first display 16 and a second display 18. The first display 16 is disposed on a surface of the operating element 14. The first display 16 is, for example, a liquid crystal display, an organic EL display, or the like. The first display 16 is a display having a touch panel function and a first receiver 20 to be described below is superimposed thereon. On the first display 16, for example, selection items and the like of a first layer among operation layers for operating a target device are displayed. Examples of the selection items of the first layer include an operation mode, an operation position, and the like of the target device.

The second display 18 is disposed in a C shape surrounding the operating element 14. On the second display 18, for example, a second layer in which a desired function or setting value is selected among the selection items selected in the first layer described above is displayed. In the present embodiment, an ignition (IG) button or a hazard button is disposed on a portion of the surface of the instrument panel 2 located between both end portions of the second display 18. However, the IG button and the hazard button may be disposed in portions other than the instrument panel 2.

Figure 3:
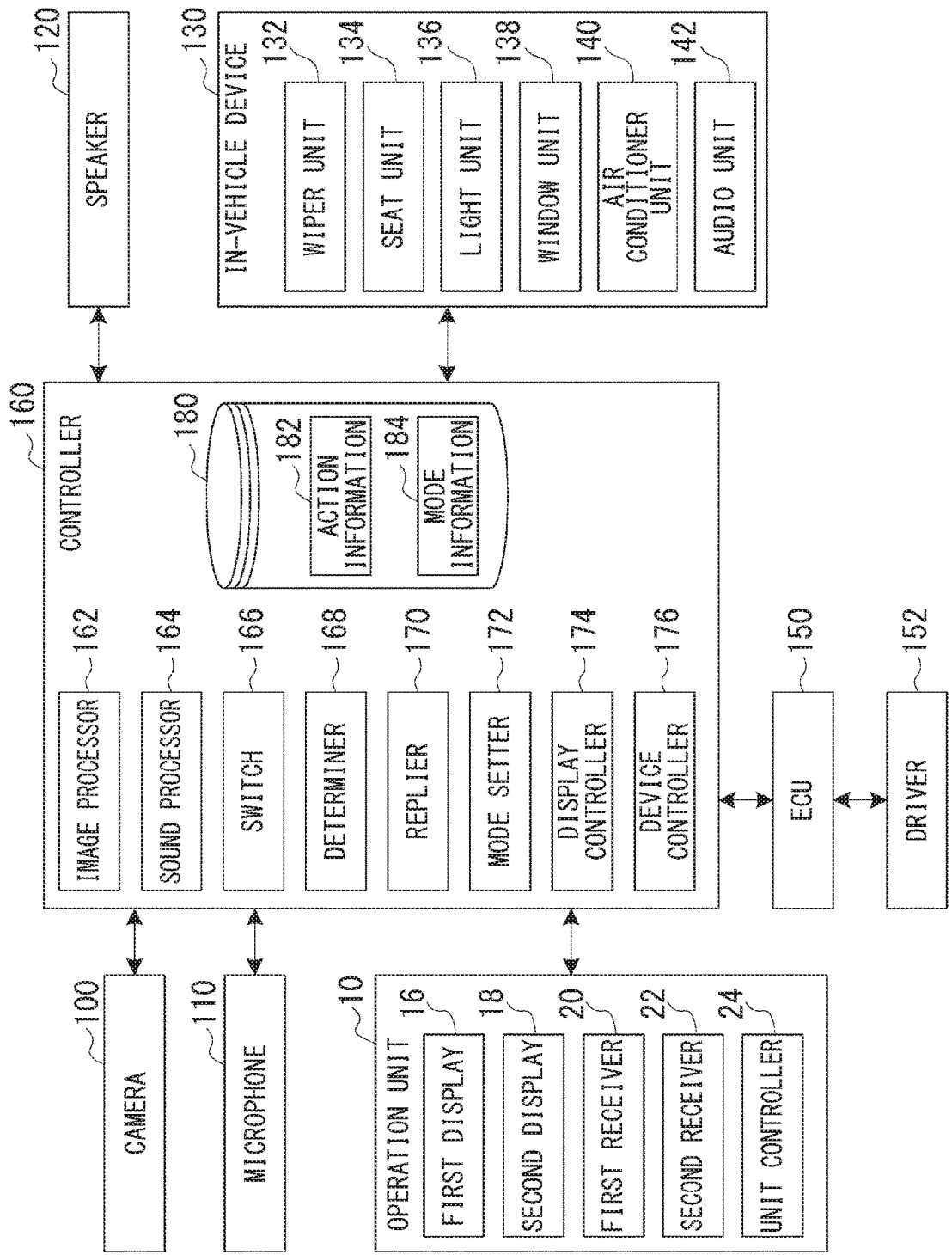
FIG. 3 is a diagram showing an example of a functional configuration of a vehicle including a controller.

FIG. 3 is a diagram showing an example of a functional configuration of a vehicle including the controller 160. The vehicle M includes, for example, an operation unit 10, a camera 100, a microphone 110, a speaker 120, an in-vehicle device 130, an ECU 150, a driver 152, and a controller 160. For example, the operation unit 10 further includes the first receiver 20, a second receiver 22, and a unit controller 24 in addition to the functional configuration described above. The first receiver 20 detects a position of an operation performed on the first display 16 and operation details and outputs detection results to the unit controller 24.

The second receiver 22 receives an operation (for example, a swing operation (a slide operation), a pushing operation, or a rotating operation) mechanically performed on the operating element 14 of the operation unit 10, and outputs a reception result to the unit controller 24. The unit controller 24 transmits the output results of the first receiver 20 and the second receiver 22 to the controller 160. The unit controller 24 controls the first display 16 and the second display 18 on the basis of instruction details of the controller 160.

The camera 100 is provided, for example, at a position where it is possible to image the occupant inside the vehicle such as a ceiling inside the vehicle. As the camera 100, for example, a digital camera using a solid-state imaging device such as a charge-coupled device (CCD) or a complementary-metal-oxide semiconductor (CMOS) is used.

The microphone 110 is provided, for example, on the instrument panel 2 or the like inside the vehicle. The microphone 110 collects speech of the occupant of the vehicle. The speaker 120 is provided, for example, on the instrument panel 2 inside the vehicle. The speaker 120 outputs information on the basis of an instruction of the controller 160.

The in-vehicle device 130 includes, for example, a wiper unit 132, a seat unit 134, a light unit 136, a window unit 138, an air conditioner unit 140, an audio unit 142, and the like. Each unit described above includes a driver and a controller (ECU; electronic control unit) that controls the driver. The controller of each unit controls its own unit on the basis of the instruction of the controller 160. The wiper unit 132 includes, for example, a wiper, a driver that drives the wiper, an ECU for controlling the driver, and the like. The seat unit 134 includes, for example, a seat, a driver that drives the backrest of the seat forward or backward, a driver that slides the seat in the X direction, an ECU for controlling these drivers, and the like. The light unit 136 includes a front light, a rear light, an ECU for controlling these lights, and the like.

The window unit 138 includes a driver that opens and closes a window provided on a door of the vehicle or the like, an ECU for controlling the driver, and the like. The air conditioner unit 140 includes a heat exchanger, an ECU for controlling an air volume to be blown from an outlet of the heat exchanger, the air conditioner, and the like. The audio unit 142 has an audio mode (a mode for receiving radio waves of AM radio and FM radio), a volume for outputting a sound to the speaker 120, an ECU for controlling selection of broadcasting station channels, and the like.

The in-vehicle device may be, for example, a navigation device, a tilt telescopic device, a light source device, and the like in addition to the above-described units.

The ECU 150 is, for example, an ECU for controlling the driver 152 and a transmission. The ECU 150 controls the driver 152 and a transmission (a shift position) on the basis of the control mode of the driver set by the controller 160. The driver 152 includes a power source such as an engine (or a motor or the like) or a transmission. The power source of the vehicle of the present embodiment is assumed to be the engine.

The controller 160 includes, for example, an image processor 162, a sound processor 164, a switch 166, a determiner 168, a replier 170, a mode setter 172, a display controller 174, and a device controller 176. These functional parts are implemented, for example, by a hardware processor such as a central processing unit (CPU) executing a program (software). Some or all of these components may be implemented by hardware (a circuit including circuitry) such as large scale integration (LSI), an application specific integrated circuit (ASIC), a field-programmable gate array (FPGA), or a graphics processing unit (GPU) or may be implemented by cooperation between software and hardware. The program may be pre-stored in a storage device such as an HDD or a flash memory of the controller or is stored in a removable storage medium such as a DVD or CD-ROM. The storage medium is attached to the drive device and therefore the program may be installed in the HDD or the flash memory of a control unit. A storage 180 is implemented by a read-only memory (ROM), a random-access memory (RAM), a hard disk drive (HDD), a flash memory, or the like. The storage 180 stores, for example, action information 182 and mode information 184. Details of the information will be described below.

The image processor 162 analyzes an image captured by the camera 100, and determines whether the occupant of the vehicle is performing a prescribed gesture. For example, the image processor 162 refers to correspondence information in which an image-processing result (for example, a distribution of feature amounts of an edge and the like) associated with the prescribed gesture is stored and determines whether or not the prescribed gesture is being made. A mode in which the image processor 162 executes a process is referred to as an "image-processing mode".

The sound processor 164 analyzes a sound collected by the microphone 110 and determines whether or not the occupant of the vehicle has made a prescribed speech. For example, the sound processor 164 refers to correspondence information in which a sound-processing result (for example, a spectrum of a sound) associated with the prescribed speech is stored and determines whether or not the prescribed speech has been made. A mode in which the sound processor 164 executes a process is referred to as a "sound-processing mode".

The switch 166 performs switching between, for example, whether to execute an image-processing mode, whether to execute a sound-processing mode, and whether to execute both the image-processing mode and the sound-processing mode in the process of determining a target-specific device. The switch 166 performs switching according to an operation of the operation unit 10 by the occupant, an operation of an operating element (not shown), a gesture (or speech) of mode switching, or the like. In this case, the image processor 162 determines whether or not a gesture for mode switching is being made and the mode switching is performed on the basis of a determination result. The switch 166 may switch which one of the image-processing mode, the sound-processing mode, and the contact operation mode with respect to the first display 16 is to be executed in the process of determining the target-specific device. The contact operation mode is a mode for determining the target-specific device when the controller 160 determines that a prescribed contact operation (a touch operation, a flick operation, a swipe operation, or the like) has been performed on the first display 16 which is a touch panel.

The determiner 168 determines a target-specific device serving as an operation target from among a plurality of specific devices on the basis of an operation (for example, an operation according to a gesture or speech or a contact operation on the first display 16) different from an operation in which the occupant of the vehicle mechanically moves the operating element 14. The specific devices are, for example, some or all of the device included in the in-vehicle device 130, the ECU 150, and the driver 152.

When the image processor 162 determines that a prescribed gesture has been made, the determiner 168 acquires information about a type of gesture and determines a target-specific device and a control mode associated with the type of gesture with reference to the action information 182. When the sound processor 164 determines that a prescribed speech has been made, the determiner 168 acquires information about a type of speech and determines a target-specific device and a control mode associated with the type of speech with reference to the action information 182. When it is determined that the contact operation has been performed, the determiner 168 acquires information about a type of contact operation and determines a target-specific device and a control mode associated with the type of contact operation with reference to the action information 182.

FIG. 4 is a diagram showing an example of details of the action information 182. The action information 182 is information in which a type of gesture, a device specified by the gesture, and a control mode are associated with each other. The action information 182 is information in which a type of speech, a device specified by the speech, and a control mode are associated with each other. Furthermore, the action information 182 is information in which a type of contact operation, a device specified by the contact operation, and a control mode are associated with each other.

The replier 170 causes the speaker to output information about the target-specific device determined by the determiner 168. The replier 170 may also cause the speaker to output information indicating a specific device (a position of a specific device) set as a control target among a plurality of homogenous target-specific devices. For example, the replier 170 causes the speaker to output information indicating that a wiper on the front side or a driver's seat has been specified. The replier 170 may cause information about the control target set in the display provided in the vehicle or information about a specified specific device to be displayed instead of (in addition to) a sound.

The mode setter 172 switches the control mode or sets the control mode to control the target-specific device in the determined control mode.

The display controller 174 controls the display form of the first display 16 or the second display 18 of the operation unit 10 on the basis of the control mode set (or switched) by the mode setter 172.

The device controller 176 controls a target-specific device on the basis of a mechanical operation performed on the operating element by the occupant of the vehicle. The device controller 176 controls the target-specific device with reference to the mode information 184. The device controller 176 may control the target-specific device on the basis of a reception result of the first receiver 20. That is, the device controller 176 may control the target-specific device on the basis of a contact operation performed on the touch panel.

In FIG. 5, the mode information 184 is information in which a control mode, details of an operation on the operation unit 10, and control details of the target-specific device are associated with each other. For example, information indicating that the direction indicator is controlled so that the direction indicator is in an off state when a position of the operating element of the operation unit 10 has been pushed in a depth direction at the reference position while the direction indicator is operating in a control mode "01" is defined in the mode information 184. Information indicating that a shift position is set to a drive range when the operating element 14 has been subjected to a slide operation from the reference position in the upward direction is defined in the mode information 184 in the control mode "01". Details of the mode information 184 will be described below. In the mode information 184, information about display forms to be displayed on the first display 16 or the second display 18 with respect to the control mode is associated with operation details. The display controller 174 controls the display form of the first display 16 or the second display 18 on the basis of the mode information 184 and the operation details.

Flowchart

Figure 6:
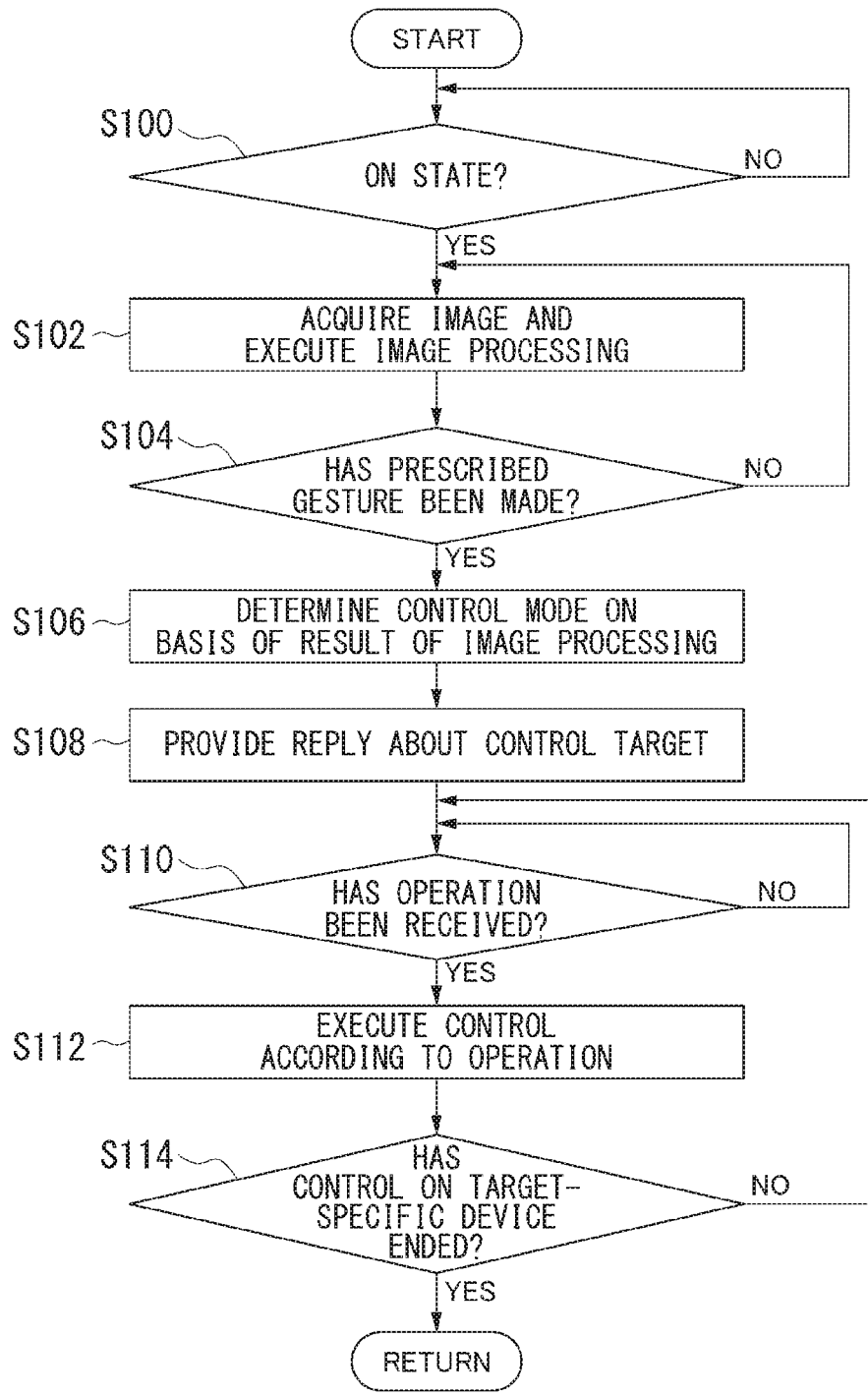
FIG. 6 is a flowchart showing an example of a flow of a process that is mainly executed by a controller.

FIG. 6 is a flowchart showing an example of a flow of a process that is mainly executed by the controller 160. Although an example in which a target-specific device is specified on the basis of a gesture in the present flowchart will be described, the target-specific device may be specified by a sound or a contact operation.

First, when the operation unit 10 is in an off state, the controller 160 determines whether or not the operation unit 10 is in an on state (step S100). When the operation unit 10 is in the on state, the image processor 162 acquires an image captured by the camera 100 and executes image processing for analyzing the acquired image (step S102). Then, the image processor 162 determines whether or not the occupant of the vehicle is making a prescribed gesture (step S104). When the occupant of the vehicle is not making the prescribed gesture, the process returns to the processing of step S102.

When the occupant of the vehicle is making the prescribed gesture, the determiner 168 determines a target-specific device and a control mode associated with a type of gesture with reference to action information 182 (step S106). Then, the mode setter 172 sets a control mode. Next, the replier 170 causes the speaker to output information about a target-specific device determined by the determiner 168 (step S108). Next, the controller 160 determines whether or not an operation of the occupant of the vehicle on the operation unit 10 has been received to control the target-specific device (step S110).

When the operation on the operation unit 10 has been received, the device controller 176 controls the target-specific device in accordance with the operation on the operation unit 10 (step S112). The display controller 174 controls a display form of the first display 16 or the second display 18 of the operation unit 10 in accordance with the operation on the operation unit 10. Next, the controller 160 determines whether or not to end the control of the target-specific device (step S114). When the controller 160 determines not to end the control on the specific target device, the process returns to the processing of step S110. When the controller 160 determines to end the control on the specific target device (for example, when a state in which the operating element 14 has not been operated continues for a prescribed time), the process of one routine of the present flowchart ends.

According to the above-described process, because the occupant can specify a specific device of a control target by a sound, a gesture, or the like and control the specific device by operating the operating element 14, operability is improved.

Specific Example (1)

Figure 7:
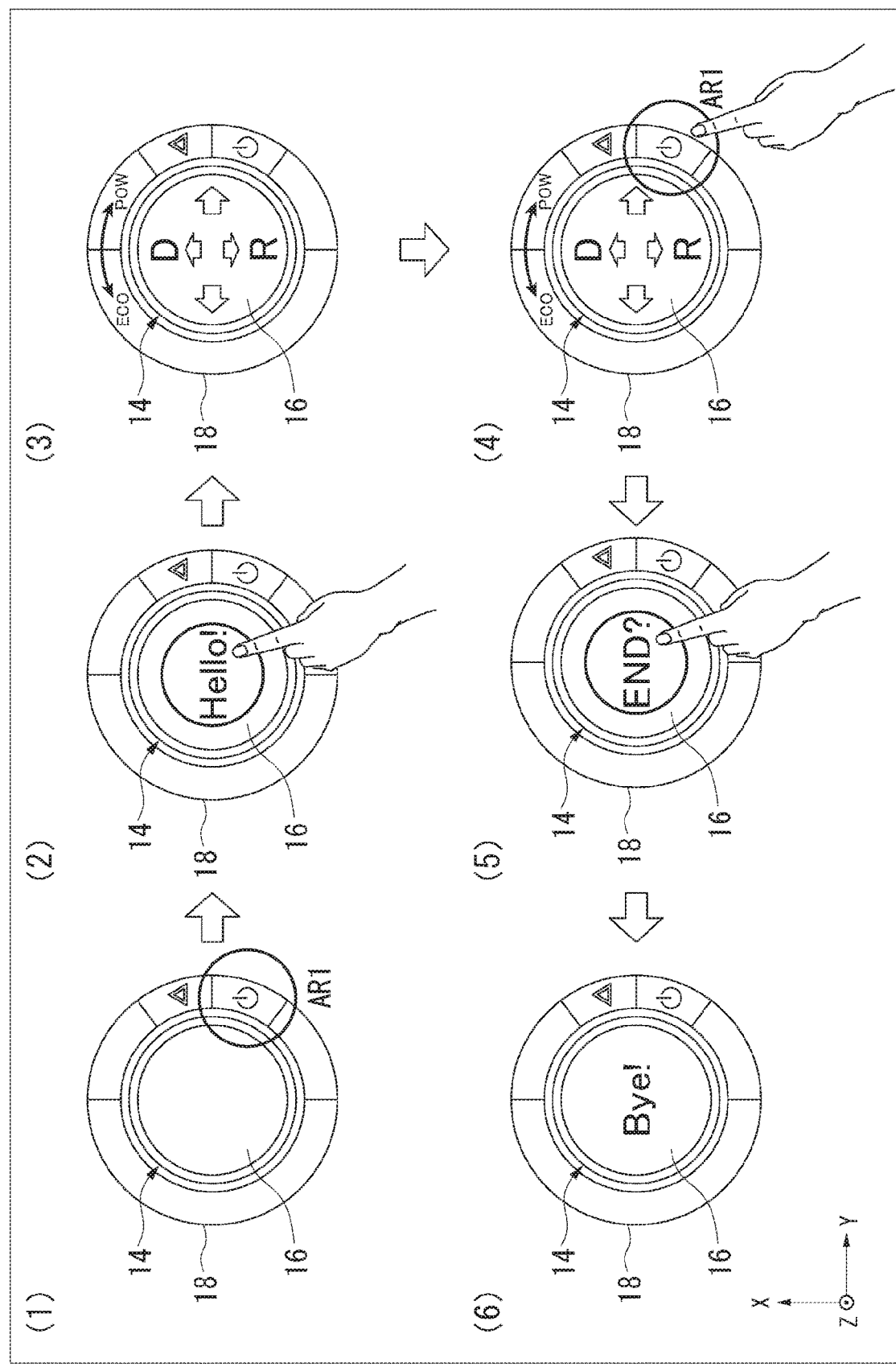
FIG. 7 is a diagram showing an example of a scene in which an operation unit is controlled in an on state and an off state.

FIG. 7 is a diagram showing an example of a scene in which the operation unit 10 is controlled so that the operation unit 10 is in the on state and the off state. When a gesture is made to touch an area AR1 of the second display 18 (when an intention for setting a power supply to the on state is indicated) in a state in which the operation unit 10 is turned off as shown in FIG. 7(1), the controller 160 controls the power supply of the operation unit 10 in the on state as shown in FIG. 7(2). Then, prescribed information is displayed on the first display 16. For example, the control mode is set to the control mode "01 (drive mode)" and the display form of the control mode "01" is displayed on the first display 16 and the second display 18 as shown in FIG. 7(3).

When a gesture is made to touch the area AR1 of the second display 18 (an intention for setting the power supply to the off state is indicated) as shown in FIG. 7(4) and the occupant of the vehicle makes a gesture for setting the power supply of the operation unit 10 to the off state as shown in FIG. 7(5), information indicating that the operation unit 10 is set to the off state is displayed on the first display 16. Then, the controller 160 controls the power supply of the operation unit 10 so that the power supply of the operation unit 10 is in the off state, as shown in FIG. 7(6).

As described above, because the operation unit 10 can be controlled so that the operation unit 10 is in the on state or the off state by the gesture, the sound, or the contact operation, the convenience of the occupant of the vehicle can be improved.

Specific Example (2)

Figure 8:
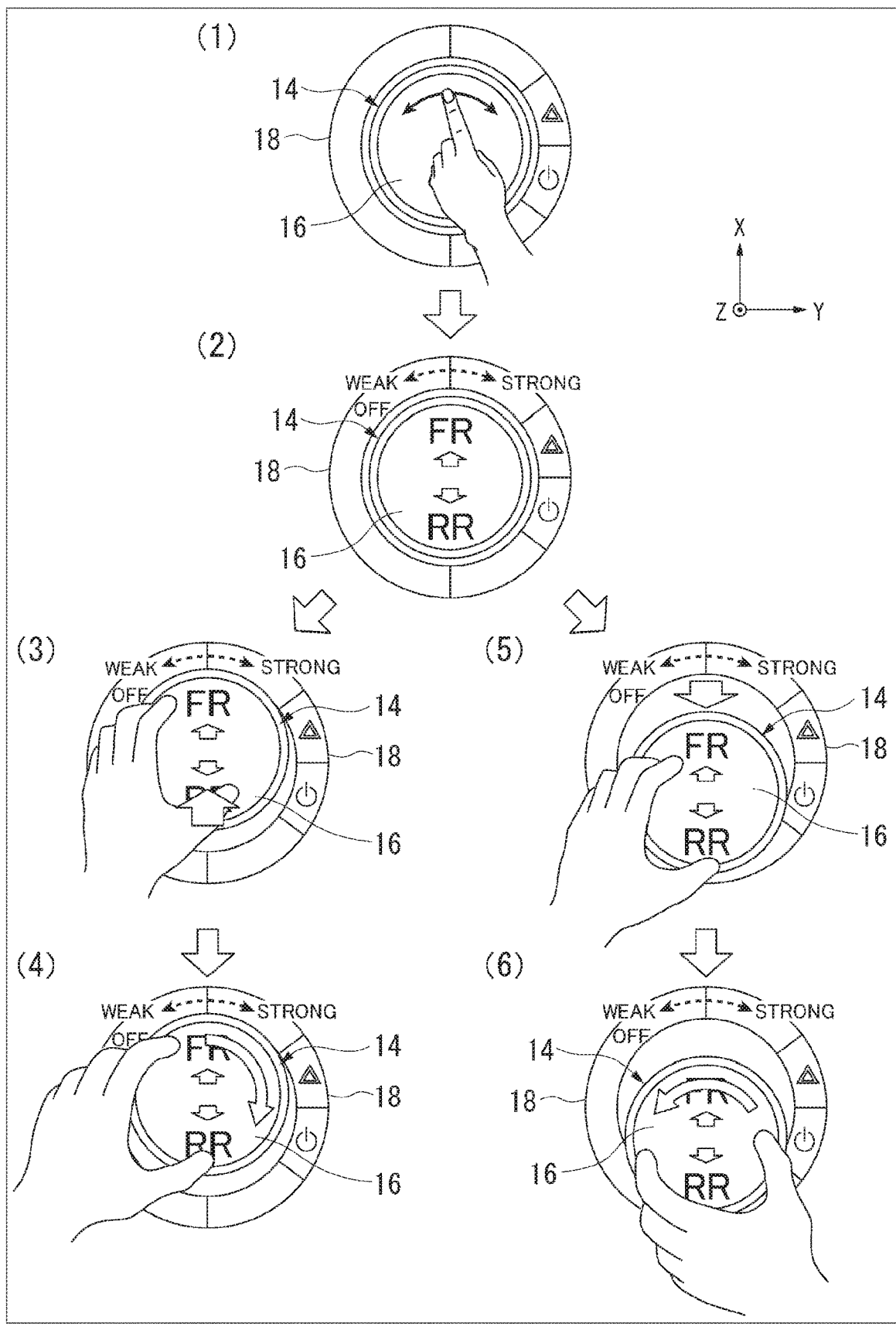
FIG. 8 is a diagram showing an example of a scene in which a wiper unit is controlled.

FIG. 8 is a view showing an example of a scene in which the wiper unit 132 is controlled. When a flick operation of specifying the wiper unit 132 is performed on the first display 16 (or when speech or a gesture for specifying the wiper unit 132 is made) as shown in FIG. 8(1), the control mode is set to a control mode for controlling the wiper unit 132 as shown in FIG. 8(2). Then, the display form according to the control mode of the wiper unit 132 is displayed on the first display 16 and the second display 18.

For example, display for guiding setting of a control position (a front side or a rear side) is displayed on the first display 16. Specifically, information indicating that the front side is set when the slide operation is performed in the upward direction and that the rear side is set when the slide operation is performed in the downward direction is displayed on the first display 16. Information indicating that an amount of control is increased when the rotating operation is performed in the right direction and that the amount of control is decreased when the rotating operation is performed in the left direction is displayed on the second display 18.

For example, as shown in FIG. 8(3), when the operating element 14 is slid in the upward direction, the controller 160 sets the wiper on the front side as a control target. In this state, as shown in FIG. 8(4), when the operating element 14 is rotated in the right direction, the controller 160 controls the speed of movement of the wiper on the front side so that the speed is faster than a reference speed.

For example, as shown in FIG. 8(5), when the operating element 14 is slid in the downward direction from the state of FIG. 8(2), the controller 160 sets the wiper on the rear side as a control target. In this state, as shown in FIG. 8(6), when the operating element 14 is rotated in the left direction, the controller 160 makes the speed of movement of the wiper on the front side slower than the reference speed and causes the operation of the wiper to be stopped when the operating element 14 is rotated in the left direction at a prescribed degree or more.

As described above, after the control target is set by the gesture, the sound, or the contact operation and the control position is determined by the slide operation (a first operation), the amount of control can be controlled by the rotating operation (a second operation). Because the occupant of the vehicle can easily control the control target in accordance with the operation context, operability is improved.

Specific Example (3)

Figure 9:
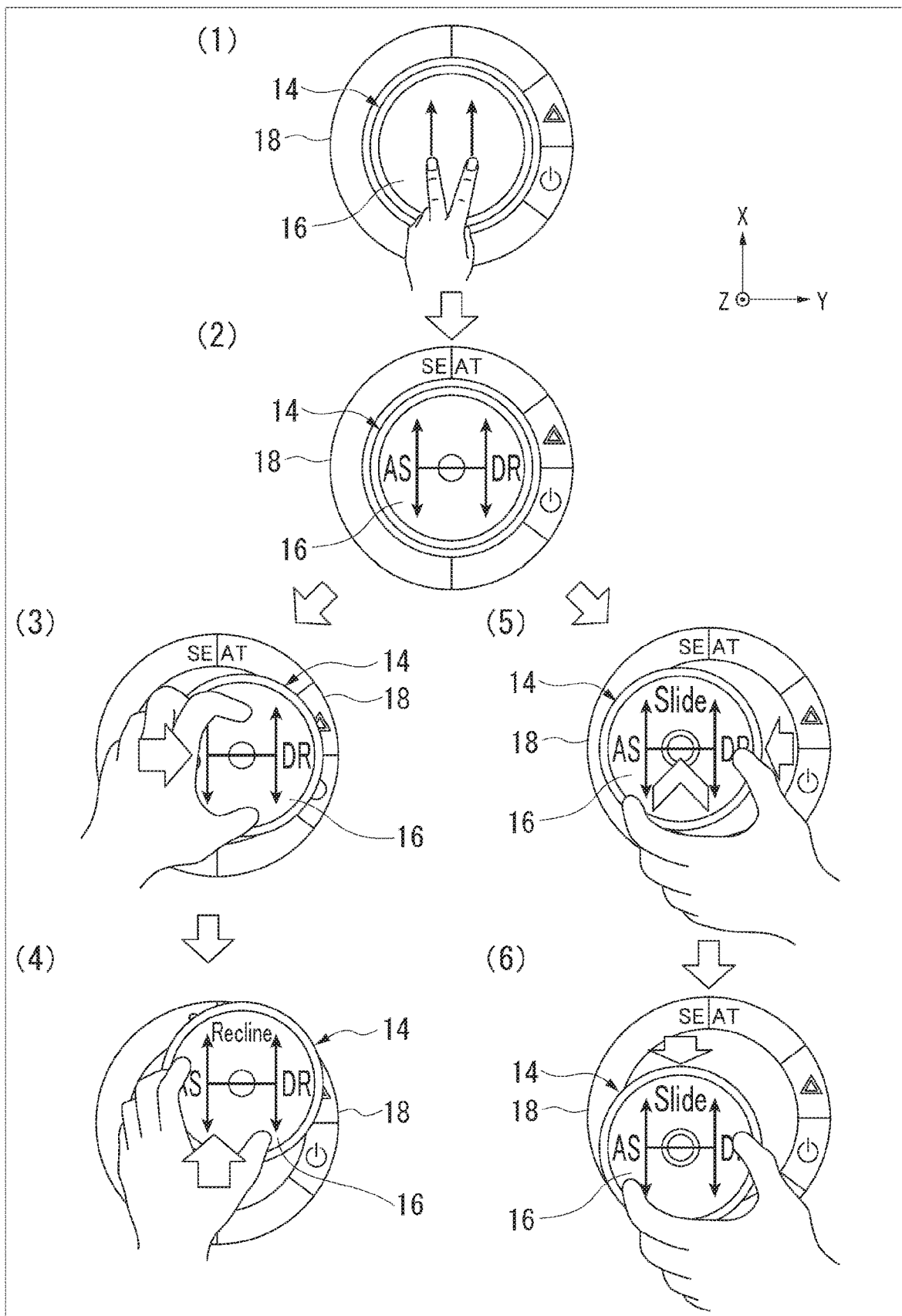
FIG. 9 is a view showing an example of a scene in which a seat unit is controlled.

FIG. 9 is a diagram showing an example of a scene in which the seat unit 134 is controlled. When a flick operation of specifying the seat unit 134 is performed on the first display 16 as shown in FIG. 9(1), the control mode is set to a mode for controlling the seat unit 134 as shown in FIG. 9(2). Then, a display form according to the control mode of the seat unit 134 is displayed on the first display 16 and the second display 18. Specifically, information indicating that the driver's seat is set when the slide operation is performed in the right direction and that the passenger seat is set when the slide operation is performed in the left direction is displayed on the first display 16. Furthermore, information indicating that the set control target is controlled when the slide operation is performed in the upward or downward direction in a state in which the slide operation is performed in the right or left direction is displayed on the first display 16. Information about the target-specific device is displayed on the second display 18.

For example, as shown in FIG. 9(3), when the operating element 14 is slid in the right direction, the controller 160 sets the driver's seat as a control target. In this state, as shown in FIG. 9 (4), when the operating element 14 is slid in the upward direction, the controller 160 controls the driver's seat so that the backrest of the driver's seat is inclined forward. In FIG. 9(4), information about control details (information indicating that the control details are reclining) is displayed on the first display 16.

For example, as shown in FIG. 9(5), in the state of FIG. 9(2), when the operating element 14 is slid in the left direction, the controller 160 sets the passenger seat as a control target. In this state, when the operating element 14 is pushed in the depth direction (the −Z direction) and the operating element 14 is slid in the downward direction as shown in FIG. 9(6), the controller 160 causes the passenger seat to be slid to the rear of the vehicle. When the operating element 14 is slid in the left direction, information about the control details (information indicating that the control details are a slide) is displayed on the first display 16.

As described above, after the control target is set by a gesture, a sound, or a contact operation and a control position is determined by the slide (the first operation), it is possible to control the amount of control according to the slide operation (the second operation) in a direction different from the above-described slide operation. Because the occupant of the vehicle can easily control the control target in accordance with the operation context, operability is improved.

Control Mode

Hereinafter, an example of each control mode will be described.

Drive Mode

Figure 10:
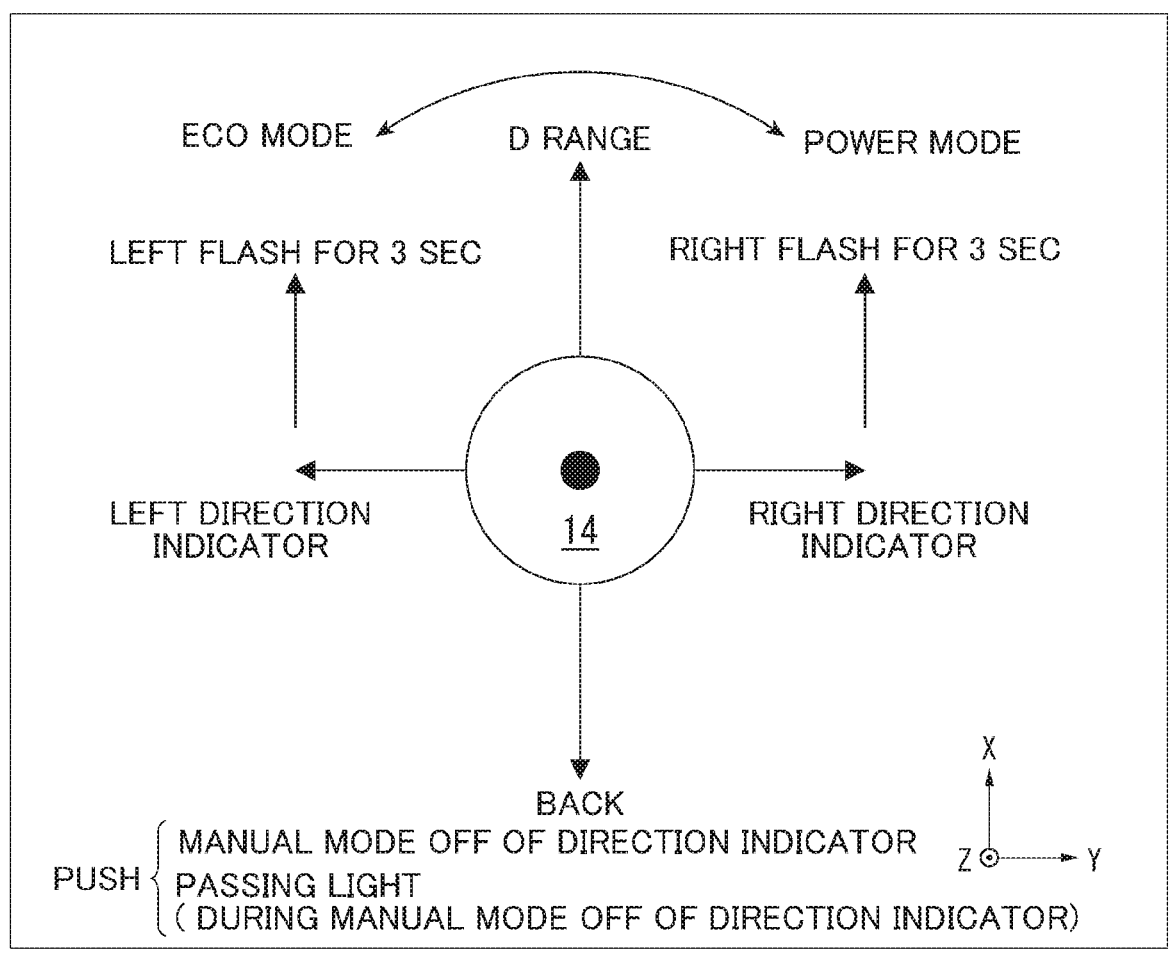
FIG. 10 is a diagram showing a drive mode.

FIG. 10 is a diagram showing a drive mode. In the drive mode, when the operating element 14 is pushed in the depth direction at the reference position in a state in which the direction indicator is turned on, the controller 160 controls the direction indicator so that the direction indicator is in the off state. When the operating element 14 is pushed in the depth direction at the reference position in a state in which the direction indicator is turned off, the controller 160 performs control for causing a light (a headlight) to be passed.

When the operating element 14 is slid in the upward direction from the reference position, the controller 160 sets a shift position to a drive range. In this state, when the operating element 14 is rotated in the right direction, the controller 160 sets the drive mode to a power drive mode. In this state, when the operating element 14 is rotated in the left direction, the controller 160 sets the drive mode to an eco-drive mode. The power drive mode is a drive mode in which acceleration is emphasized more than in the eco-drive mode and the eco-drive mode is a drive mode in which fuel efficiency is emphasized more than in the power drive mode. The power drive mode or the eco-drive mode may be set by rotating the operating element 14 at the reference position.

Figure 11A:
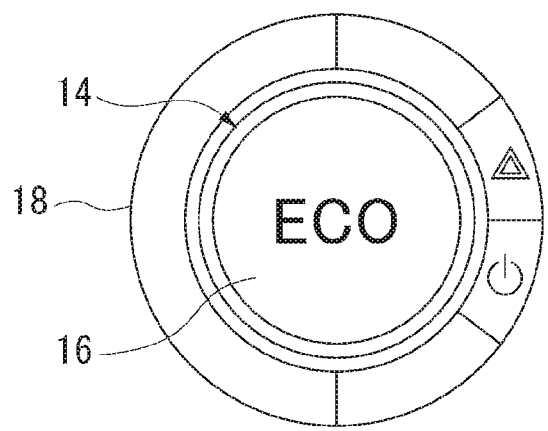
FIG. 11A is a diagram showing an example of a display form when the eco-drive mode is set.
Figure 11B:
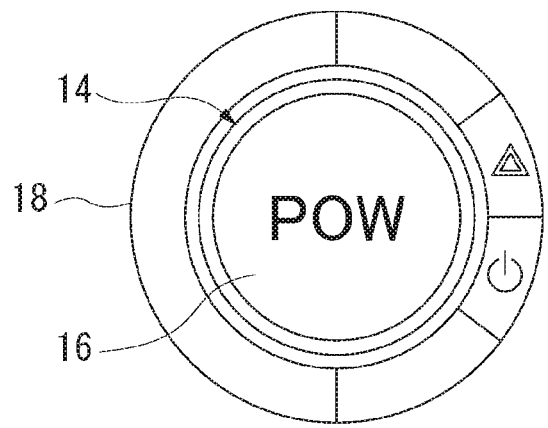
FIG. 11B is a diagram showing an example of a display form when the eco-drive mode is set.

When the eco-drive mode has been set, the first display 16 is controlled so that the first display 16 has a display form in accordance with the eco-drive mode as shown in FIG. 11A. When the power drive mode has been set, the first display 16 is controlled so that the first display 16 has a display form in accordance with the power drive mode as shown in FIG. 11B. When the operating element 14 is slid in the downward direction from the reference position, the controller 160 sets the shift position to a back range.

When the operating element 14 is slid in the right direction from the reference position, the controller 160 specifies a right direction indicator. In this state, when the operating element 14 is slid in the upward direction, the controller 160 causes the specified right direction indicator to flash for a prescribed time (for example, 3 seconds). When the operating element 14 is slid in the left direction from the reference position, the controller 160 specifies a left direction indicator. In this state, when the operating element 14 is slid in the upward direction, the controller 160 causes the specified left direction indicator to flash for a prescribed time (for example, 3 seconds).

Wiper Mode

Figure 12:
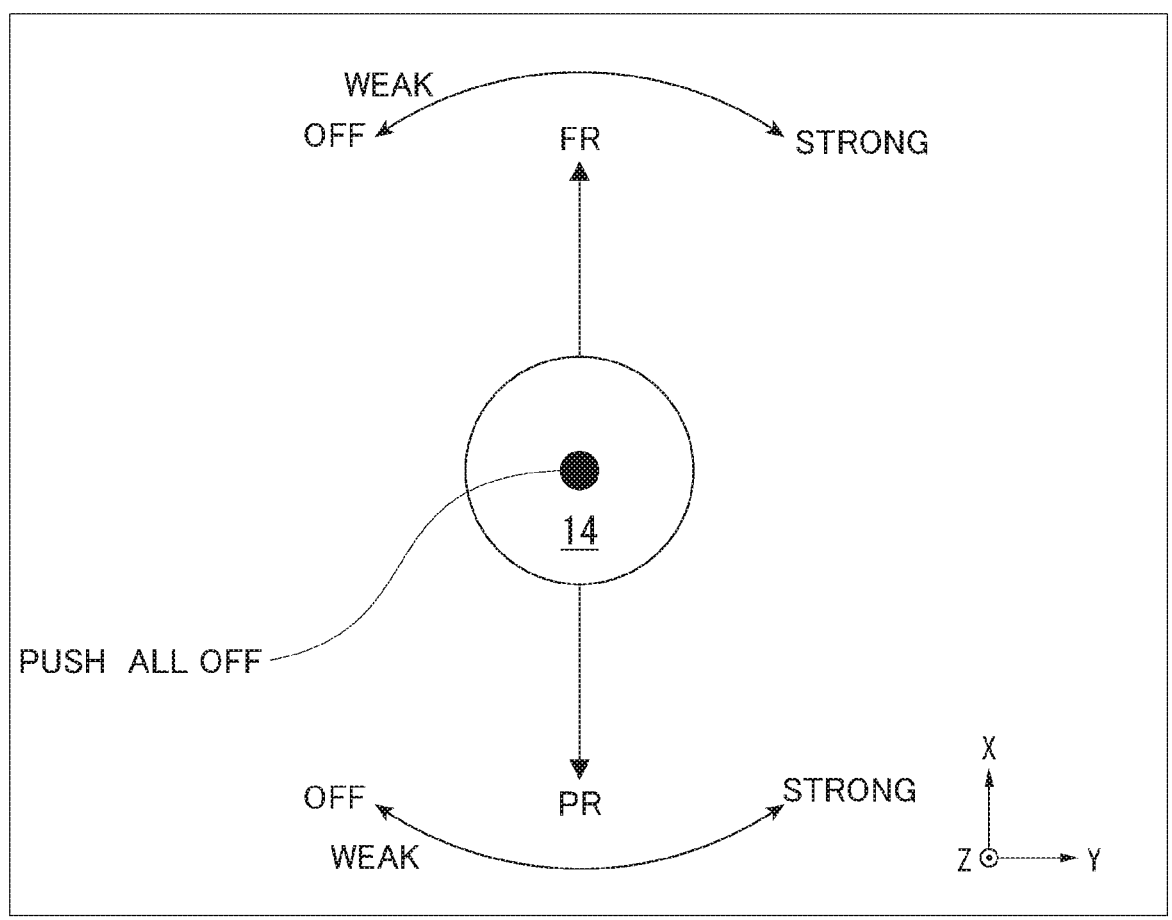
FIG. 12 is a diagram showing a wiper mode.

FIG. 12 is a diagram showing a wiper mode. In the wiper mode, when the operating element 14 is pushed in the depth direction at the reference position in a state in which the wiper is turned on, the controller 160 controls the wiper so that the wiper is in the off state. When the operating element 14 is slid in the upward direction from the reference position, the controller 160 sets the wiper on the front side as a control target. In this state, when the operating element 14 is slid in the downward direction from the reference position, the controller 160 sets the wiper on the rear side as a control target. When the operating element 14 is rotated in the right direction in a state in which the operating element 14 has been slid in the upward or downward direction, the controller 160 controls the wiper so that the speed of movement of the wiper of the control target is faster than reference speed. The controller 160 controls the wiper so that the speed of movement of the wiper of the control target is slower than the reference speed when the operating element 14 is rotated in the left direction and causes the operation of the wiper to be stopped when the operating element 14 is rotated in the left direction at a prescribed degree or more.

Light Mode

Figure 13:
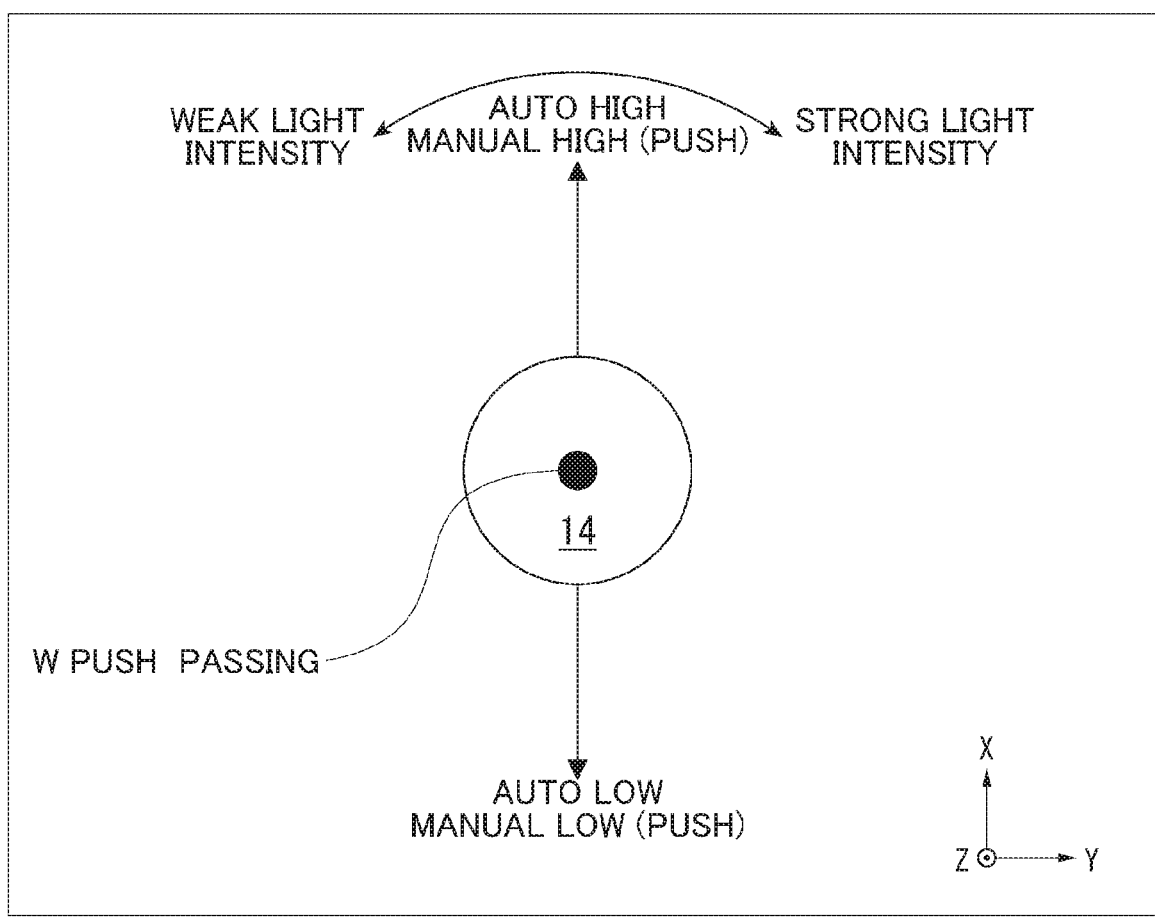
FIG. 13 is a diagram showing a light mode.

FIG. 13 is a diagram showing a light mode. In the light mode, when the operating element 14 is pushed twice in the depth direction at the reference position within a prescribed time, the controller 160 controls a light so that the light is passed. When the operating element 14 is slid in the upward direction from the reference position, the controller 160 sets a light on the front side as a control target and controls the light in an auto high mode. The auto high mode is a mode in which, for example, a high beam is basically radiated and a low beam is radiated when a preceding vehicle, an oncoming vehicle, or the like has been detected in front. When the operating element 14 is slid in the upward direction from the reference position in a state in which the operating element 14 is pushed in the depth direction at the reference position, the controller 160 controls the light so that the high beam is radiated.

When the operating element 14 is slid in the downward direction from the reference position, the controller 160 sets a light on the rear side as a control target and controls the light in an auto low mode. The auto low mode is, for example, a mode in which a low beam is basically radiated and a high beam is radiated when there is no preceding vehicle or oncoming vehicle and the brightness in front is less than or equal to a prescribed degree. When the operating element 14 is slid in the downward direction from the reference position in a state in which the operating element 14 is pushed in the depth direction at the reference position, the controller 160 controls the light so that the low beam is radiated.

Control is performed so that an amount of light radiated by the light increases when the operating element 14 is rotated in the right direction, and the amount of light radiated by the light decreases when the operating element 14 is rotated in the left direction, in a state in which the operating element 14 is at the reference position or a state in which the operating element 14 is slid in the upward or downward direction from the reference position.

Window Mode

Figure 14:
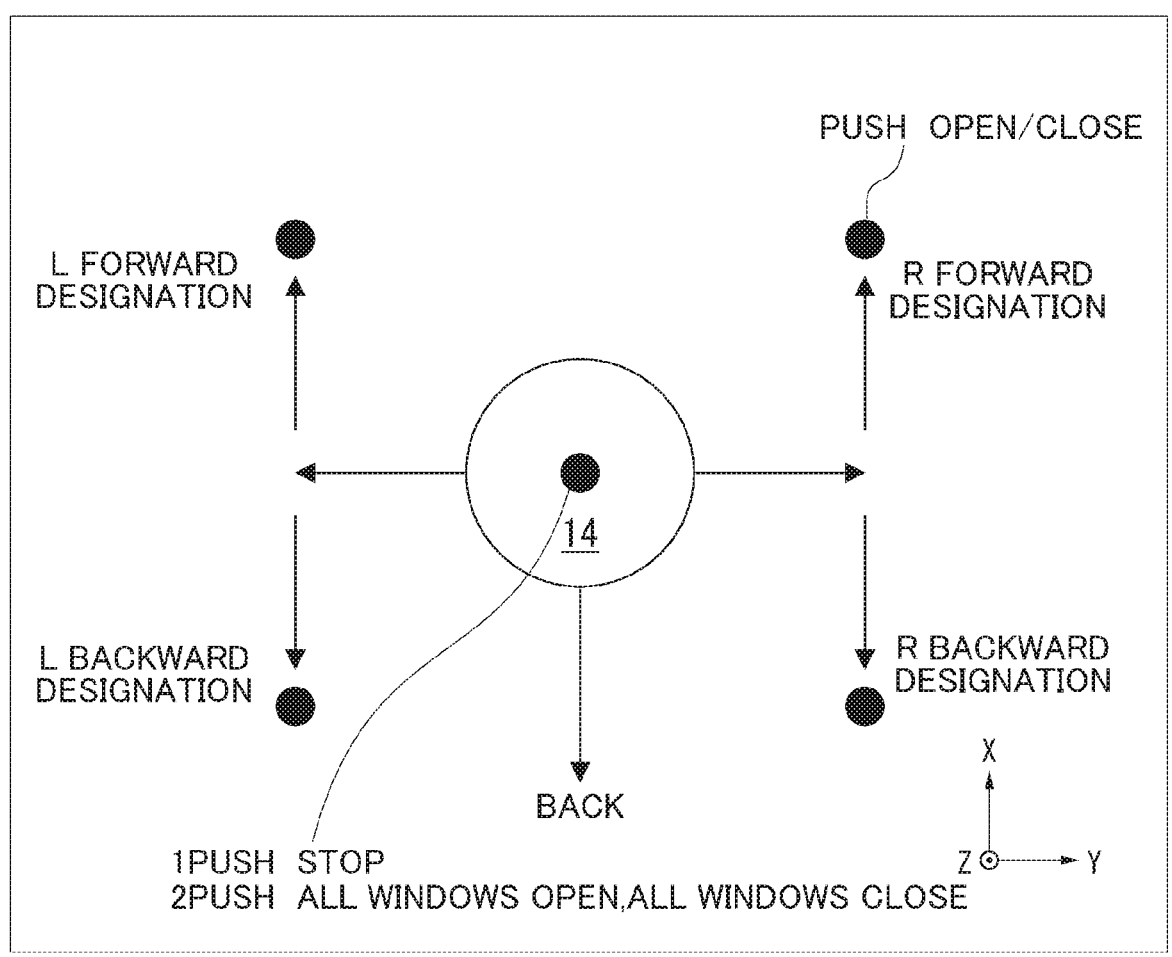
FIG. 14 is a diagram showing a window mode.

FIG. 14 is a diagram showing a window mode. In the window mode, the controller 160 controls windows so that the windows are fully open when the operating element 14 is pushed twice in the depth direction at the reference position within a prescribed time in a state in which the windows of the vehicle are closed. When the operating element 14 is pushed twice in the depth direction at the reference position within a prescribed time in a state in which the windows of the vehicle are open, the controller 160 controls the windows so that the windows are fully closed. When the operating element 14 is pushed once in the depth direction at the reference position during the above-described control (control of full opening or full closing), the controller 160 stops the control.

When the operating element 14 is slid in the right direction from the reference position, the controller 160 sets the window on the right side as a control target. When the operating element 14 is slid in the upward direction from a position where the slide operation has been performed in the right direction, the controller 160 sets the window on the front side as a control target. When the operating element 14 is slid in the downward operation from a position where the slid operation has been performed in the upward direction, the controller 160 sets the window on the rear side as a control target. Then, when the operating element 14 is pushed in the depth direction at the position where the window of the control target is set (on the front or rear side or the right or left side), control is performed so that the window is closed in a state in which the window is open and control is performed so that the window is open in a state in which the window is closed.

Air Conditioner Mode

Figure 15:
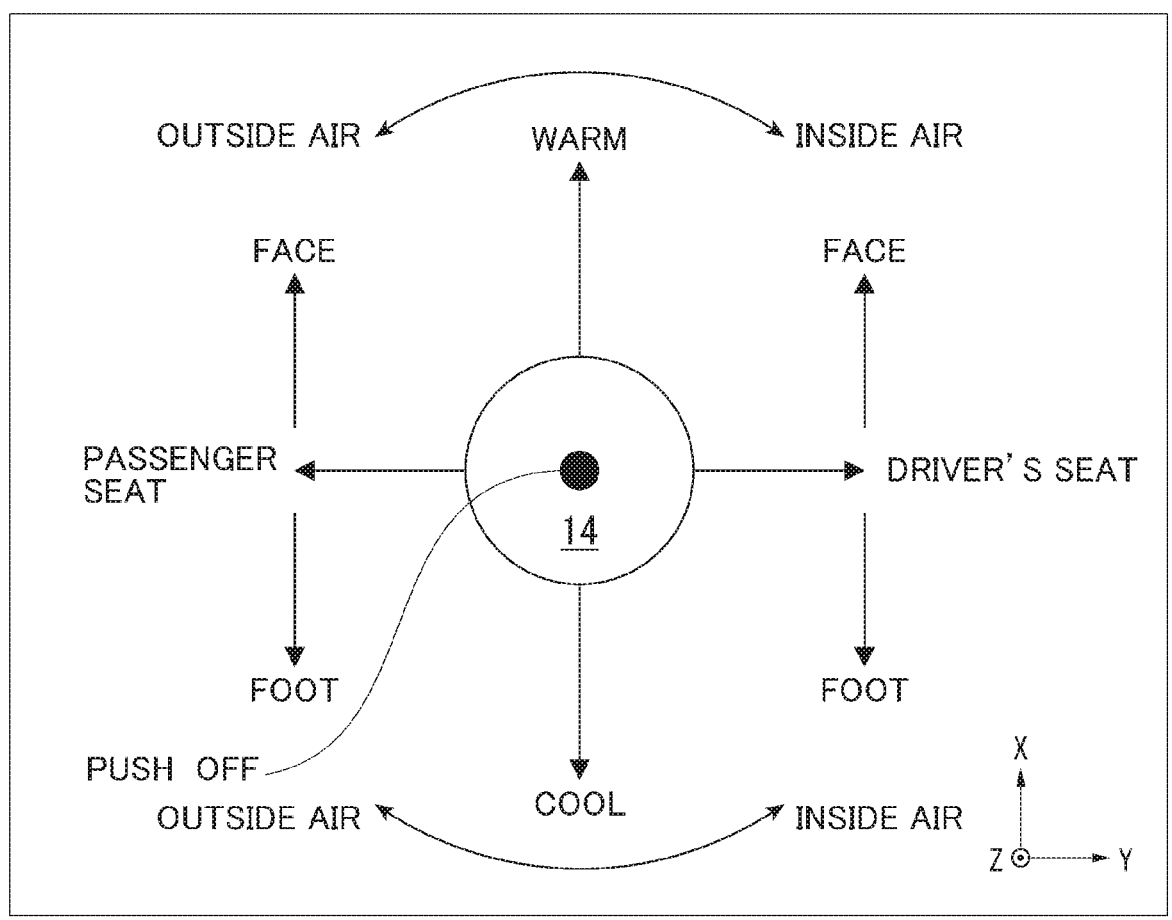
FIG. 15 is a diagram showing an air conditioner mode.

FIG. 15 is a diagram showing an air conditioner mode. In the air conditioner mode, when the operating element 14 is pushed in the depth direction at the reference position in a state in which the air conditioner is turned on, the controller 160 controls the air conditioner so that the air conditioner is in the off state. When the operating element 14 is slid in the upward direction from the reference position, the controller 160 sets the air conditioner to a heating mode. In this state, an inside air circulation mode is set when the operating element 14 is slid in the right direction and an outside air circulation mode is set when the operating element 14 is slid in the left direction.

When the operating element 14 is slid in the downward direction from the reference position, the controller 160 sets the air conditioner to a cooling mode. In this state, the inside air circulation mode is set when the operating element 14 is slid in the right direction and the outside air circulation mode is set when the operating element 14 is slid in the left direction. In a state in which the operating element 14 is at the reference position, the inside air circulation mode may be set when the rotating operation is performed in the right direction and the outside air circulation mode may be set when the rotating operation is performed in the left direction.

When the operating element 14 is slid in the right direction from the reference position, the controller 160 sets adjustment of an air volume to be blown at the driver's seat side. When the slide operation is performed in the upward direction from the position where the slide operation has been performed in the right direction, the controller 160 sets adjustment of an air volume to be blown in a face direction. When the operating element 14 is slid in the downward direction from a position where the slide operation has been performed in the upward direction, the controller 160 sets adjustment of an air volume to be blown at the foot. When the operating element 14 is slid in the left direction from the reference position, the controller 160 sets adjustment of an air volume to be blown at the passenger seat side. When the slide operation is performed in the upward direction from the position where the slide operation has been performed in the left direction, the controller 160 sets adjustment of the air volume to be blown in the face direction. When the operating element 14 is slid in the downward direction from the position where the slide operation has been performed in the upward direction, the controller 160 sets adjustment of the air volume to be blown at the foot.

Audio Mode

Figure 16:
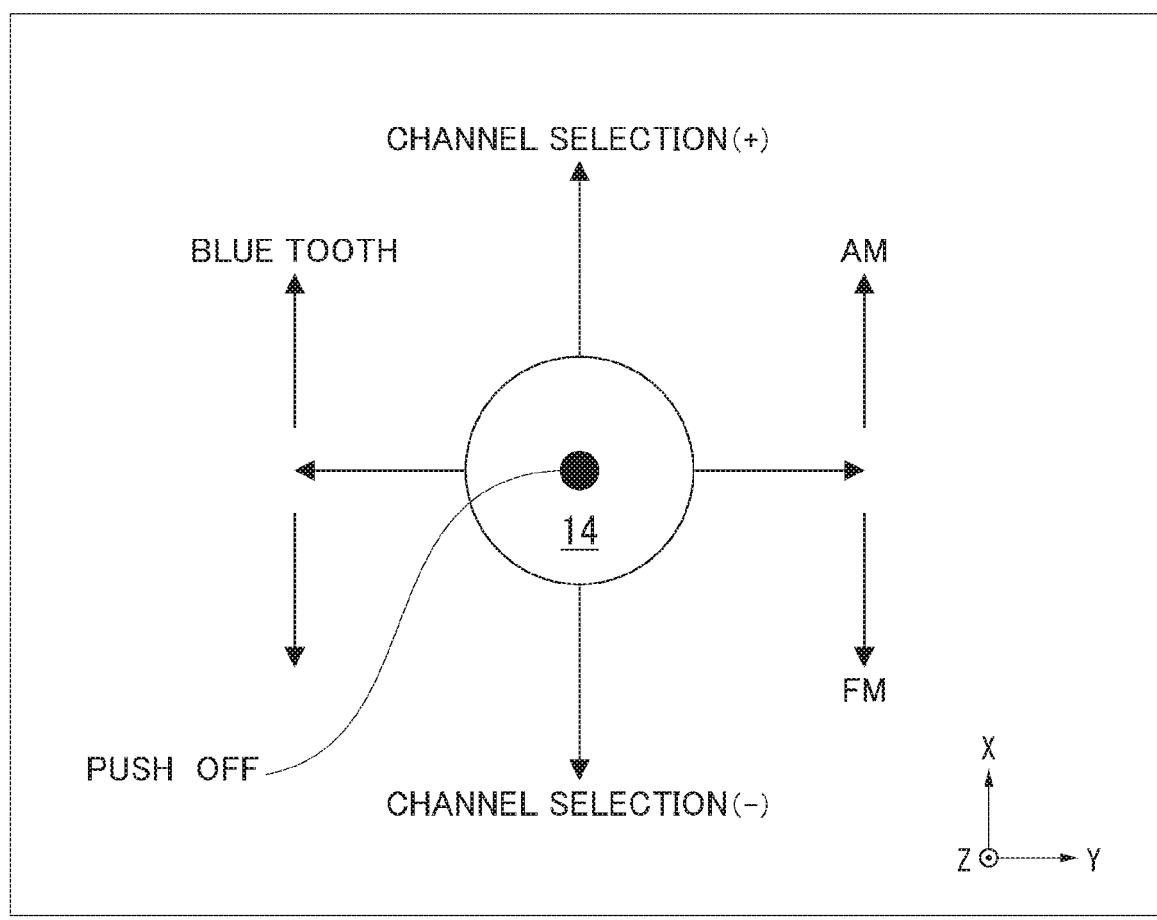
FIG. 16 is a diagram showing an audio mode.

FIG. 16 is a diagram showing an audio mode. In the audio mode, when the operating element 14 is pushed in the depth direction at the reference position in a state in which an audio is in the on state, the controller 160 controls the audio so that the audio is in the off state. When the operating element 14 is slid in the upward direction from the reference position, the controller 160 controls a frequency for channel selection so that the frequency for channel selection is in a positive direction. When the operating element 14 is slid in the downward direction from the reference position, the controller 160 controls the frequency for channel selection so that the frequency for channel selection is in a negative direction.

When the operating element 14 is slid in the right direction from the reference position and controlled so that the operating element 14 is in the upward direction, the controller 160 sets an AM mode for listening to AM. When the operating element 14 is slid in the right direction from the reference position and controlled so that the operating element 14 is in the downward direction, the controller 160 sets an FM mode for listening to FM. When the operating element 14 is slid in the left direction from the reference position and controlled so that the operating element 14 is in the upward direction, the controller 160 sets a mode for performing Bluetooth (registered trademark) communication. When the operating element 14 is slid in the right direction from the reference position and controlled so that the operating element 14 is in the downward direction, the controller 160 sets the audio to a mode different from the above.

Seat Mode

Figure 17:
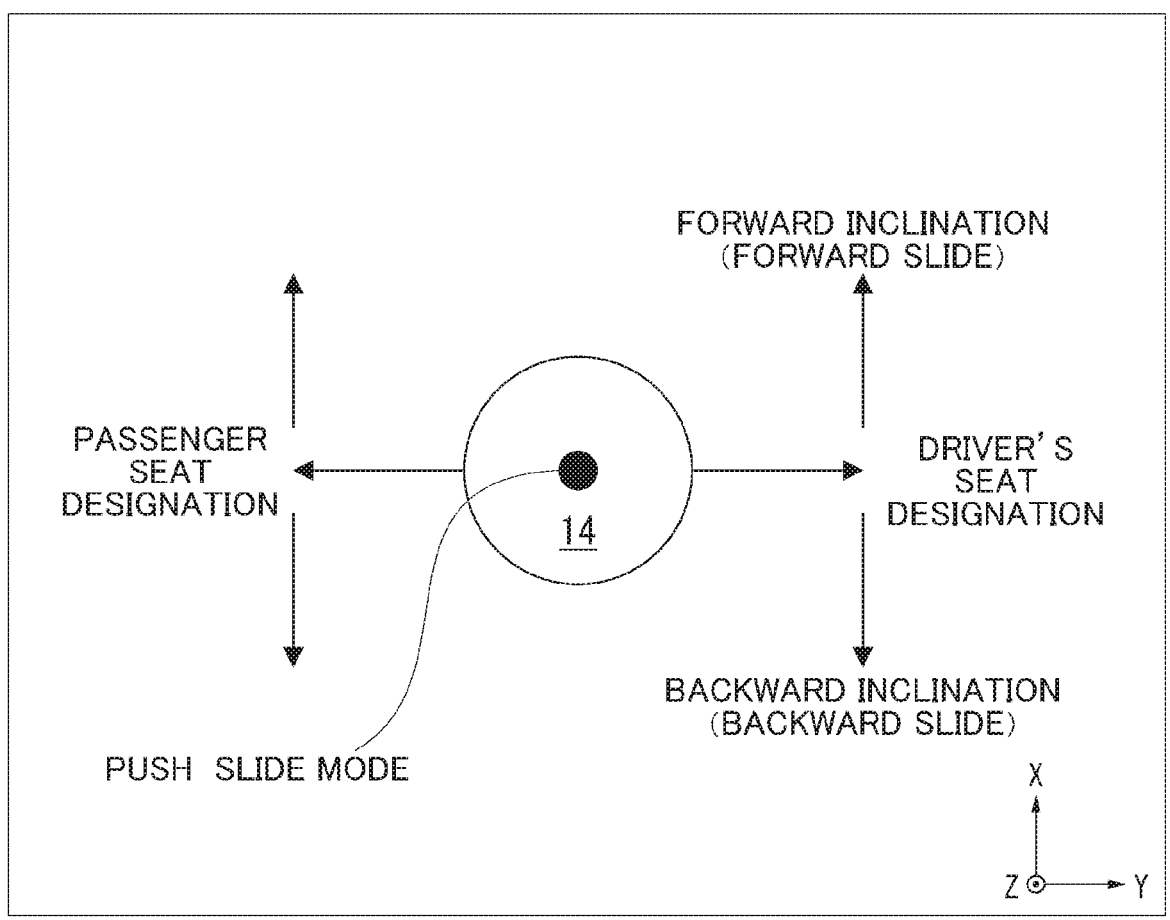
FIG. 17 is a diagram showing a seat mode.

FIG. 17 is a diagram showing a seat mode. In the seat mode, when the operating element 14 is pushed in the depth direction at the reference position, the controller 160 sets a slide mode. The slide mode is a mode for performing control for causing the bottom of the seat to be slid. When the operating element 14 is slid in the right direction from the reference position, the controller 160 sets the driver's seat as a control target. When the operating element 14 is slid in the upward direction from a position where the slide operation has been performed in the right direction, the backrest of the driver's seat is controlled so that the backrest of the driver's seat is in the forward direction. When the operating element 14 is slid in the downward direction from a position where the slide operation has been performed in the upward direction, the backrest of the driver's seat is controlled so that the backrest of the driver's seat is in the backward direction. When the slide mode is set, the bottom of the driver's seat is controlled so that the bottom of the driver's seat is slid in the forward direction if the operating element 14 is slid in the upward direction from a position thereof. When the operating element 14 is slid in the downward direction from a position where the slide operation has been slid in the upward direction, the bottom of the driver's seat is controlled so that the bottom of the driver's seat is slid in the backward direction. When the operating element 14 is slid in the left direction from the reference position, the controller 160 sets the passenger seat as a control target and performs control equivalent to the above.

Although an example in which the controller 160 determines a target-specific device according to a gesture or a sound, specifies a position (a position such as a front side or a rear side) of a specific device to be controlled among target-specific devices according to a mechanical operation on the operating element 14, and controls a specified target-specific device has been described above, the controller 160 may determine a target-specific device according to a mechanical operation on the operating element 14, specify a position (a position such as a front side or a rear side) of a specific device to be controlled among target-specific devices according to a gesture or a sound, and control a specified target-specific device instead thereof. That is, the controller 160 may determine a target-specific device serving as an operation target from among a plurality of specific devices on the basis of a first specific operation which is one of a mechanical-specific operation performed on the operating element by an occupant of a vehicle and a non-mechanical-specific operation different from the specific operation and control the target-specific device on the basis of a second specific operation different from the first specific operation between the mechanical-specific operation performed on the operating element by the occupant of the vehicle and the non-mechanical-specific operation different from the specific operation.

Hardware Configuration

Figure 18:
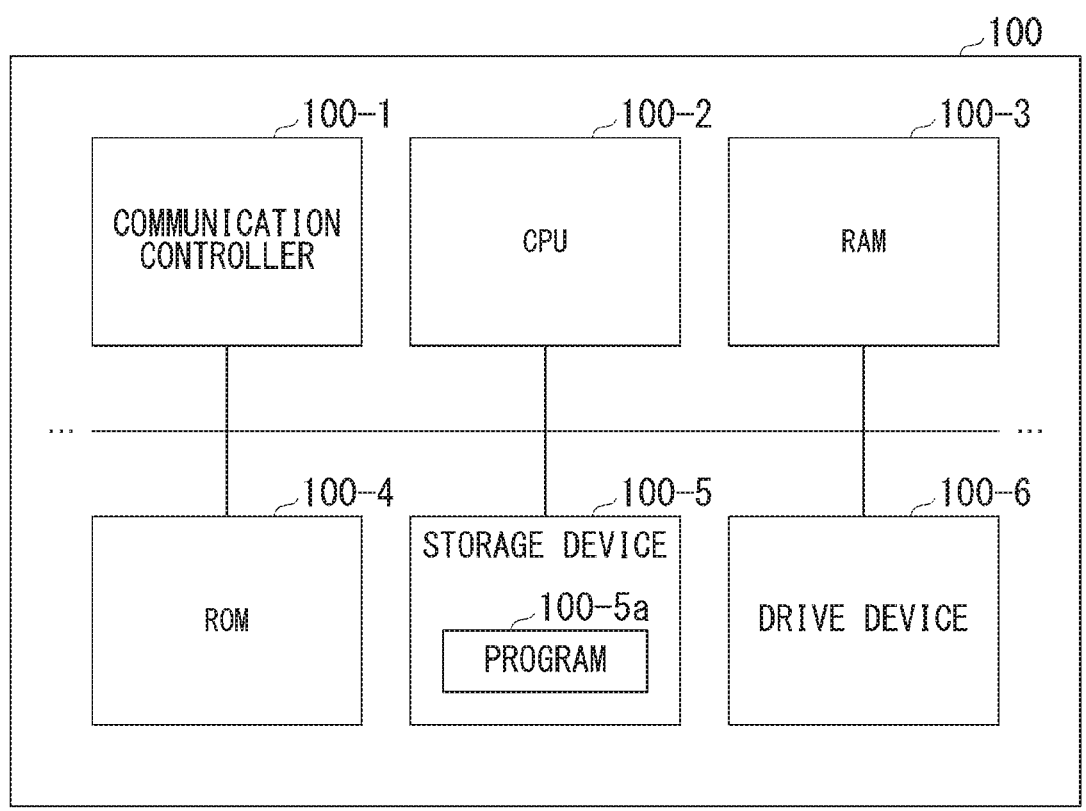
FIG. 18 is a diagram showing an example of a hardware configuration of a controller of the embodiment.

FIG. 18 is a diagram illustrating an example of a hardware configuration of the controller 160 according to an embodiment. As shown, the controller 160 is configured so that a communication controller 160-1, a CPU 160-2, a random access memory (RAM) 160-3 used as a working memory, and a read only memory (ROM) 160-4 storing a boot program and the like, a storage device 160-5 such as a flash memory or a hard disk drive (HDD), and a drive device 160-6 are mutually connected through an internal bus or a dedicated communication line. The communication controller 160-1 communicates with components other than the controller 160. The storage device 160-5 stores a program 160-5a executed by the CPU 160-2. This program is loaded to the RAM 160-3 by a direct memory access (DMA) controller (not shown) or the like and executed by the CPU 160-2. Thereby, some or all of the image processor 162, the sound processor 164, the switch 166, the determiner 168, the replier 170, the mode setter 172, the display controller 174, and the device controller 176 are implemented.

According to the embodiment described above, the vehicle operation system 1 includes the operation unit 10 disposed within a vehicle and including the operating element 14 configured to receive an operation of an occupant of the vehicle; the determiner 168 configured to determine a target-specific device serving as an operation target from among a plurality of specific devices on the basis of an operation (a gesture, speech, or a contact operation) different from a mechanical operation performed on the operating element 14 by the occupant of the vehicle; and the device controller 176 configured to control the target-specific device on the basis of the mechanical operation performed on the operating element 14 by the occupant of the vehicle, thereby improving operability.

Although modes for carrying out the present invention have been described using embodiments, the present invention are not limited to the embodiments, and various modifications and substitutions can also be made without departing from the scope of the present invention.

What is claimed is:

1. A vehicle operation system, comprising:
a processor configured to execute instructions that perform operations, comprising:
an operation unit disposed within a vehicle and including an operation shaft and an operating element configured to receive a mechanical operation of an occupant of the vehicle, the operation element being attached to a tip of the operation shaft;
a memory configured to store instructions;
one or more processors configured to execute the instructions to:
determine a target-specific device serving as an operation target representative of a plurality of specific devices on the basis of an operation different from a mechanical operation performed on the operating element by the occupant of the vehicle; and
control the target-specific device on the basis of the mechanical operation performed on the operating element by the occupant of the vehicle,
wherein the operation unit has a first display having a touch panel function, the first display is disposed on a surface of the operating element, and,
the one or more processors execute the instructions to:
refer to an action information registered in a storage and cause the first display to display a guide information for guiding content of control in a control mode in according with an operation of a first form, in a case in which the occupant had performed the operation of the first form for the first display, the action information is information in which a form of an operation by an occupant for the first display and the control mode for controlling the target-specific device are associated with each other, and control the target-specific device based on the control mode and a form of a mechanical operation, in a case in which the occupant had operated a mechanical operation for the operating element according to the guide information.

2. The vehicle operation system according to claim 1, wherein one or more processors further execute instructions to set a control mode for controlling the target-specific device,
   wherein the target-specific device is controlled on the basis of the control mode and the mechanical operation performed on the operating element by the occupant of the vehicle.

3. The vehicle operation system according to claim 2, wherein the different operation is a gesture or speech of the occupant of the vehicle or a contact operation on a touch panel provided in the operating element.

4. The vehicle operation system according to claim 3, wherein the mechanical operation is at least any one of a swing operation, a pushing operation, and a rotating operation.

5. The vehicle operation system according to claim 4, wherein the one or more processors further execute instructions to control the target-specific device on the basis of an input operation on the touch panel provided in the operating element.

6. The vehicle operation system according to claim 5, wherein the one or more processors further execute instructions to set a target-specific device serving as a control target from among a plurality of homogeneous target-specific devices on the basis of a first operation that is mechanical and controls an amount of control of the set target-specific device on the basis of a second operation that is mechanically performed after the first operation.

7. The vehicle operation system according to claim 6, wherein the second operation is an operation that is performed in a state in which the first operation has been performed.

8. The vehicle operation system according to claim 7,
   wherein the vehicle includes the plurality of homogeneous target-specific devices, and
   wherein the operating element includes a first display for causing information for guiding any one target-specific device to be selected among the plurality of homogeneous target-specific devices to be displayed.

9. The vehicle operation system according to claim 8, wherein the first display is provided in the operating element.

10. The vehicle operation system according to claim 3, wherein the one or more processors are able to perform switching between a determination mode for determining the target-specific device on the basis of the gesture and a determination mode for determining the target-specific device on the basis of the speech.

11. The vehicle operation system according to claim 10, wherein the one or more processors execute further instructions to reply to the occupant of the vehicle with a determination result.

12. The vehicle operation system according to claim 1
   wherein the operation unit has a second display, the second display is disposed surrounding the operating element, and
   the one or more processors execute the instructions to:
   control the power supply of the operation unit in an on state, when a gesture is made to touch the second display in a state in which the operation unit is turned off.

13. A vehicle operation system, comprising:
   an operation unit disposed within a vehicle and including an operation shaft and an operating element configured to receive a mechanical operation of an occupant of the vehicle, the operation element being attached to a tip of the operation shaft;
   a memory configured to store instructions; and
   one or more processors configured to execute the instructions to:
   determine a target-specific device serving as an operation target representative of a plurality of specific devices on the basis of a first specific operation that is one operation of a mechanical-specific operation performed on the operating element by the occupant of the vehicle and a non-mechanical-specific operation different from the specific operation; and
   control the target-specific device on the basis of a second specific operation different from the first specific operation between the mechanical-specific operation performed on the operating element by the occupant of the vehicle and the non-mechanical-specific operation different from the specific operation;
   wherein the operation unit has a first display having a touch panel function, the first display is disposed on a surface of the operating element, and,
   the one or more processors execute the instructions to:
   refer to an action information registered in a storage and cause the first display to display a guide information for guiding content of control in a control mode in according with an operation of a first form, in a case in which the occupant had performed the operation of the first form for the first display, the action information is information in which a form of an operation by an occupant for the first display and the control mode for controlling the target-specific device are associated with each other, and
   control the target-specific device based on the control mode and a form of a mechanical operation, in a case in which the occupant had operated a mechanical operation for the operating element according to the guide information.

14. A vehicle operation method, comprising:
   determining, by a computer, a target-specific device serving as an operation target representative of a plurality of specific devices on the basis of an operation different from a mechanical operation performed on an operating element of an operation unit by an occupant of a vehicle, wherein the operation unit is disposed within the vehicle and includes an operation shaft and the operating element configured to receive a mechanical operation of the occupant of the vehicle, the operation element being attached to a tip of the operation shaft; and
   controlling, by the computer, the target-specific device on the basis of the mechanical operation performed on the operating element by the occupant of the vehicle, wherein the operation unit has a first display having a touch panel function, the first display is disposed on a surface of the operating element, and,
   referring, by the computer, to an action information registered in a storage and causing the first display to display a guide information for guiding content of control in a control mode in accordance with an operation of a first form, in a case in which the occupant had performed the operation of the first form for the first display, the action information is information in which a form of an operation by an occupant for the first display and the control mode for controlling the target-specific device are associated with each other, and
controlling, by the computer, the target-specific device based on the control mode and a form of a mechanical operation, in a case in which the occupant had operated a mechanical operation for the operating element according to the guide information.

\* \* \* \* \*